US009937887B2

(12) United States Patent
Munch

(10) Patent No.: US 9,937,887 B2
(45) Date of Patent: Apr. 10, 2018

(54) METHOD AND APPARATUS FOR PROVIDING A SAFING FUNCTION IN A RESTRAINING SYSTEM

(71) Applicant: Carl A. Munch, Troy, MI (US)

(72) Inventor: Carl A. Munch, Troy, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 149 days.

(21) Appl. No.: 14/570,057

(22) Filed: Dec. 15, 2014

(65) Prior Publication Data

US 2015/0100209 A1 Apr. 9, 2015

Related U.S. Application Data

(63) Continuation of application No. 11/580,771, filed on Oct. 13, 2006, now Pat. No. 8,996,255.

(60) Provisional application No. 60/726,683, filed on Oct. 13, 2005.

(51) Int. Cl.

| B60R 21/0132 | (2006.01) |
| G01M 17/007 | (2006.01) |
| B60R 21/01 | (2006.01) |

(52) U.S. Cl.
CPC ..... *B60R 21/0132* (2013.01); *G01M 17/0078* (2013.01); *B60R 2021/01027* (2013.01); *B60R 2021/01286* (2013.01); *B60R 2021/01327* (2013.01)

(58) Field of Classification Search
CPC .......... B60R 21/0132; B60R 21/01027; B60R 21/01286; B60R 21/01327; G01M 17/0078
See application file for complete search history.

(56) References Cited

U.S. PATENT DOCUMENTS

| 4,438,424 A | 3/1984 | Yasui |
| 4,891,984 A | 1/1990 | Fujii et al. |
| 5,587,906 A | 12/1996 | McIver et al. |
| 5,684,336 A | 11/1997 | McCurdy |

(Continued)

FOREIGN PATENT DOCUMENTS

| DE | 4030612 A1 | 4/1991 |
| DE | 19827557 A1 | 12/1999 |

(Continued)

OTHER PUBLICATIONS

Selvakumar, A., Yazdi, N., Najafi, K., "Low Power, Wide Rance Threshold Acceleration Sensing System," Publication Year: 1996, pp. 186-191.

*Primary Examiner* — Tuan C To
(74) *Attorney, Agent, or Firm* — Tarolli, Sundheim, Covell & Tummino LLP

(57) ABSTRACT

An apparatus (10) is provided for controlling an actuatable restraint (14, 16) in a vehicle (12). An sensor (24) is mounted in the vehicle (12) and outputs an electrical signal having a characteristic indicative of a vehicle event. A discrimination circuit (42) is coupled to the sensor (24) and determines if a predetermined event occurred. A safing circuit (50) is copied to the sensor (24) signal and sequestered from the discrimination circuit (42) for determining if the predetermined event occurred. An actuation device is actuates the restraint when both the discrimination circuit (42) and the safing circuit (50) determine the predetermined event occurred.

9 Claims, 3 Drawing Sheets

(56) References Cited

U.S. PATENT DOCUMENTS

| | | | |
|---|---|---|---|
| 5,809,451 A | 9/1998 | Parsons et al. | |
| 6,028,467 A * | 2/2000 | Burrows | H03K 19/018557 |
| | | | 327/109 |
| 6,274,948 B1 | 8/2001 | Blank et al. | |
| 6,448,671 B1 * | 9/2002 | Wallace | B60R 21/01 |
| | | | 307/10.1 |
| 6,449,545 B1 * | 9/2002 | Nitschke | B60R 21/01 |
| | | | 701/32.7 |
| 6,516,263 B1 | 2/2003 | McCall et al. | |
| 6,566,765 B1 * | 5/2003 | Nitschke | B60R 21/01 |
| | | | 180/268 |
| 6,621,301 B1 * | 9/2003 | Mattes | H04L 12/40 |
| | | | 326/86 |
| 6,650,971 B2 | 11/2003 | Haas | |
| 7,138,938 B1 | 11/2006 | Prakah-Asante et al. | |
| 7,167,807 B2 | 1/2007 | Recknagel et al. | |
| 7,209,844 B2 * | 4/2007 | Merrick | B60R 21/0136 |
| | | | 702/116 |
| 7,292,921 B2 | 11/2007 | Schuller et al. | |
| 7,295,909 B2 | 11/2007 | Recknagel | |
| 7,499,781 B2 * | 3/2009 | Hermann | B60R 21/0132 |
| | | | 180/268 |
| 7,692,522 B2 * | 4/2010 | Hartinger | H01H 1/0015 |
| | | | 335/131 |
| 8,204,611 B2 | 6/2012 | Berglund | |
| 8,346,428 B2 | 1/2013 | Knechtges | |
| 8,880,318 B2 | 11/2014 | Ito et al. | |
| 2001/0056544 A1 * | 12/2001 | Walker | B60R 25/02 |
| | | | 726/2 |
| 2003/0004629 A1 | 1/2003 | Cooper et al. | |
| 2003/0036831 A1 | 2/2003 | Glock et al. | |
| 2003/0122669 A1 * | 7/2003 | Filippov | B60N 2/002 |
| | | | 340/563 |
| 2003/0155754 A1 * | 8/2003 | Komaki | B60R 21/017 |
| | | | 280/735 |
| 2004/0030482 A1 | 2/2004 | Fuehrer et al. | |
| 2004/0045760 A1 | 3/2004 | Baumgartner et al. | |
| 2004/0056652 A1 * | 3/2004 | Bomya | B60R 21/0136 |
| | | | 324/207.17 |
| 2005/0080544 A1 | 4/2005 | Suzuki et al. | |
| 2005/0093540 A1 * | 5/2005 | Merrick | B60R 21/0136 |
| | | | 324/239 |
| 2005/0165537 A1 | 7/2005 | Dort | |
| 2005/0171672 A1 * | 8/2005 | Wallner | B60R 21/0132 |
| | | | 701/70 |
| 2006/0052924 A1 * | 3/2006 | Prakah-Asante | B60R 21/0134 |
| | | | 701/45 |
| 2006/0058934 A1 * | 3/2006 | Le | B60R 21/0132 |
| | | | 701/38 |
| 2006/0085114 A1 | 4/2006 | Roelleke et al. | |
| 2008/0204209 A1 | 8/2008 | Theisen | |
| 2008/0306658 A1 * | 12/2008 | Beisheim | B60R 21/013 |
| | | | 701/46 |

FOREIGN PATENT DOCUMENTS

| | | | | |
|---|---|---|---|---|
| DE | 10115217 | | 8/2002 | |
| DE | 10226260 | | 12/2003 | |
| DE | 10227003 | | 1/2004 | |
| DE | 10243514 | | 4/2004 | |
| DE | 10252227 | | 5/2004 | |
| DE | 10308652 | | 9/2004 | |
| DE | 10348388 | | 5/2005 | |
| DE | 102004008602 | | 9/2005 | |
| DE | 102004013268 | | 9/2005 | |
| DE | 102004040323 | | 2/2006 | |
| EP | 0400960 A1 * | 12/1990 | | B60R 21/0132 |
| EP | 0427397 A2 * | 5/1991 | | B60R 21/0132 |
| JP | 05254384 A * | 10/1993 | | B60R 21/0132 |
| JP | 06086411 | | 11/1994 | |
| JP | 2003182555 | | 7/2003 | |

* cited by examiner

METHOD AND APPARATUS FOR PROVIDING A SAFING FUNCTION IN A RESTRAINING SYSTEM

CROSS-REFERENCE TO RELATED APPLICATION

The present application is a continuation of U.S. patent application Ser. No. 11/580,771 to Munch filed Oct. 13, 2006 and claims priority to U.S. Provisional Patent Application Ser. No. 60/726,683 to Munch, filed Oct. 13, 2005.

TECHNICAL FIELD

The present invention is directed to actuatable restraining devices and is particularly directed to a method and apparatus for providing a safing function an actuatable restraining system.

BACKGROUND OF THE INVENTION

Actuatable, occupant restraint systems, such as air bags, for vehicles are known in the art. Such restraint systems include one or more collision sensing devices for sensing vehicle crash acceleration (vehicle deceleration). Air bag restraint systems further include an electrically actuatable igniter, referred to as a squib. The collision sensing device may be an accelerometer that outputs an electrical signal having an electrical characteristic indicative of the crash event. A monitoring circuit analyzes the electrical output signals from the accelerometer and makes a determination if a deployment crash event is occurring. If a deployment crash event is determined to be occurring, an electrical current is passed through the squib to ignite the squib. When ignited, the squib initiates the flow of inflation fluid into an air bag from a source of inflation fluid, as is known in the art.

The monitoring circuit connected to the accelerometer is often a controller, such as a microcomputer, which performs a crash algorithm on the acceleration signal for the purpose of discriminating between a deployment event and a non-deployment crash event. When a deployment crash event is determined to be occurring, the restraint is actuated, e.g., an air bag is deployed.

Many types of crash algorithms for discriminating between deployment and non-deployment crash events are known in the art. Algorithms typically are adapted to detect particular types of crash events for particular vehicle platforms. One example of such an algorithm is taught in U.S. Pat. No. 5,587,906 to McIver et al. and assigned to TRW Inc.

Air bag restraint systems may require more than one sensor for detection of a deployment crash event. For example, plural sensors may be arranged in a voting scheme in which all the sensors must "agree" that a deployment crash event is occurring before restraint actuation is initiated. In such an arrangement, the second sensor is referred to as a "safing sensor." Air bag actuation occurs only if the first sensor and the safing sensor indicate a deployment crash event is occurring.

If a single sensor is used, a "safing function" can be achieved by a single controller performing two algorithms on the crash acceleration signal, one being designated us the discrimination algorithm and one being designated as the safing algorithm. If both algorithm determinations agree that a deployment crash event is occurring, the restraint is actuated. As an alternative, the single controller could perform two algorithms on acceleration signals from two separate accelerometer outputs.

SUMMARY OF THE INVENTION

In accordance with one example embodiment of the present invention, an apparatus is provided comprising a vehicle event having a vehicle event signal output and a safing function output.

In accordance with another example embodiment of the present invention, an apparatus is provided for controlling an actuatable restraint system in a vehicle. The apparatus comprises an event sensor mountable in the vehicle, the event sensor outputting an electrical signal having an identifiable characteristic upon the occurrence of a predetermined vehicle event. A discrimination circuit is coupled to the sensor signal and determines if the predetermined event occurred. A safing circuit is coupled to the sensor signal and is sequestered from said discrimination circuit for determining if the predetermined event occurred. The apparatus further comprises an actuation device for actuating the restraint when both the discrimination circuit and the safing circuit determine the predetermined crash event occurred.

In accordance with another example embodiment of the present invention, a method is provided for controlling an actuatable restraint system in a vehicle comprising the step of mounting a vehicle event sensor in the vehicle, the vehicle event sensor having an electrical output signal having an identifiable characteristic upon the occurrence of a predetermined vehicle event. The method further includes the steps of monitoring the sensor output and determining, using a discrimination algorithm, if the monitored sensor output indicates that the predetermined event occurred. The method further includes the steps of determining, using a safing algorithm, if the monitored sensor output indicates that predetermined event occurred and actuating the restraint when both the determination using the discrimination algorithm and the determination using the safing algorithm agree that predetermined event occurred.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF AN EXAMPLE EMBODIMENT

Figure 1:
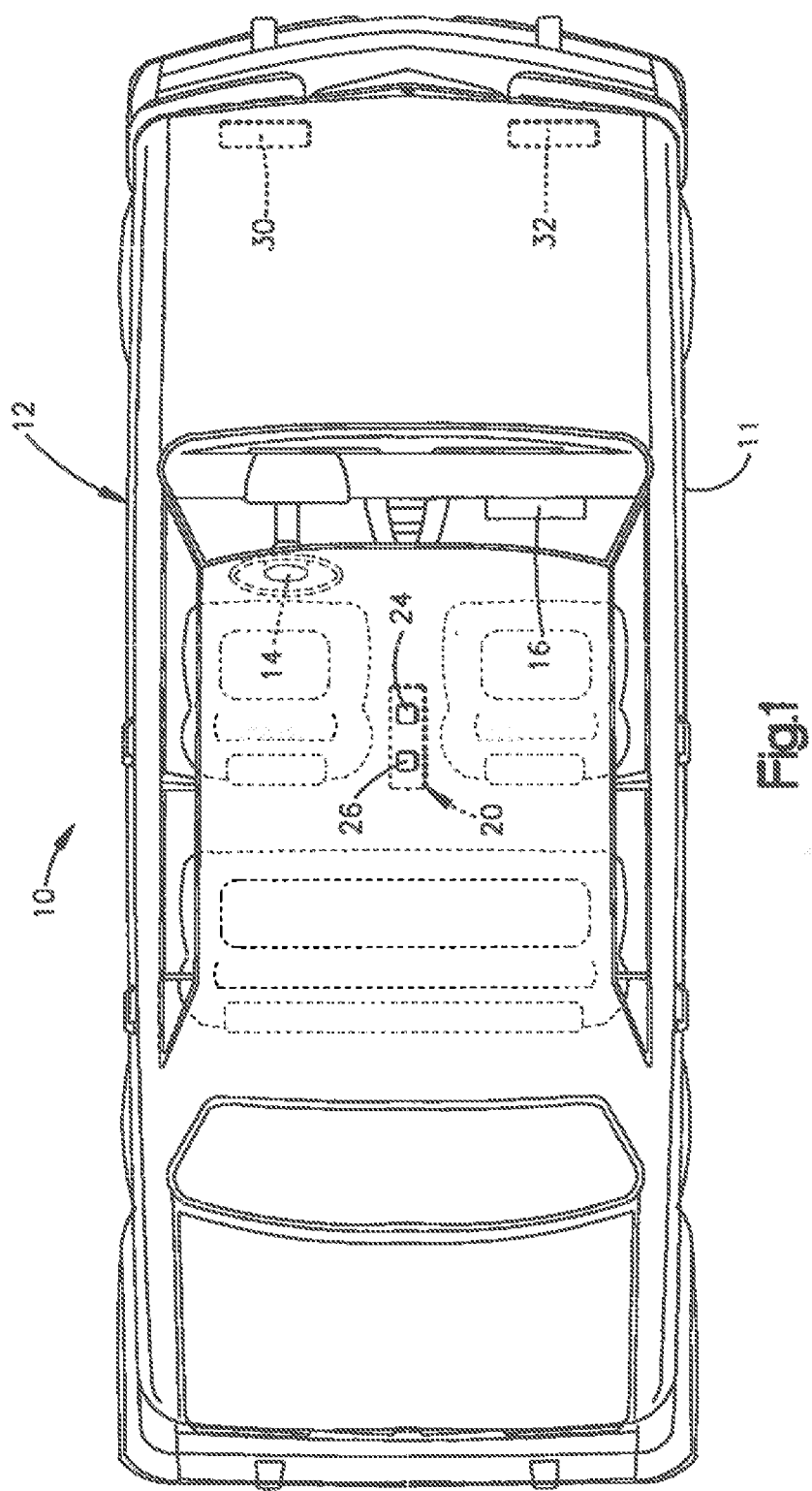
FIG. 1 is a schematic diagram of a vehicle showing sensor locations in accordance with one example embodiment of the present invention.

Referring to FIG. 1, an occupant restraint system 10, in accordance with one example embodiment of the present invention, for use in a vehicle 11, is shown. The system 10 includes an actuatable restraint system 12, such as an air bag restraint system, having a driver's side bag 14 and a passenger's side bag 16. Although, the restraint system 12 is shown and described as an air bag restraint system, the present invention is not limited to use with an air bag restraint system. The present invention is applicable to any actuatable restraining device having single or multiple actuatable stages or to a plurality of actuatable restraint devices that can be simultaneously or sequentially actuated. Only a single driver and passenger air bag arrangement is described tier simplicity of explanation. The invention is also applicable to a vehicle having multiple actuatable restraint devices including actuatable seat belts, side bags, side curtains, knee bolsters, roll-over bags, actuatable head restraints, rear seat bags, etc.

The system 10 includes at least one, centrally located crash or collision sensor assembly 20. In accordance with one example embodiment, the assembly 20 includes an accelerometer 24 oriented to sense crash acceleration along the front-to-rear axis of the vehicle also know in the art as the vehicle's X-axis. The assembly 20 may also include an accelerometer 26 oriented to sense crash acceleration in the vehicle's Y-axis that is perpendicular to the front-to-rear axis of the vehicle. The centrally located crash acceleration sensors 24 and 26, each providing a crash acceleration signal having a characteristic indicative of sensed crash acceleration along their associated axis of orientation. These centrally located crash acceleration signals can take any of several forms known in the art. The crash acceleration signal can have amplitude, frequency, pulse duration, etc., characteristics that vary as a function of the crash acceleration. In accordance with an example embodiment, the crash acceleration signals have frequency and amplitude components that are functionally related to the crash acceleration.

In addition to the central crash acceleration sensors 24, 26, the system 10 includes crush zone sensors 30, 32. These crush zone sensors are mounted in a forward portion of the vehicle 12 with one sensor on each front side of the vehicle, respectively. The output signals from the crush zone sensors 30, 32 also have frequency and amplitude components that are functionally related to the crash acceleration experienced by the vehicle. The crush zone sensors are preferably mounted at the radiator location of the vehicle and serve to better discriminate certain types of crash conditions by supplementing the single point crash sensors 24, 26 at the central vehicle location. As mentioned, other sensors could be used such as side crash sensors, roll-over sensors, side impact sensors, etc.

Figure 2:
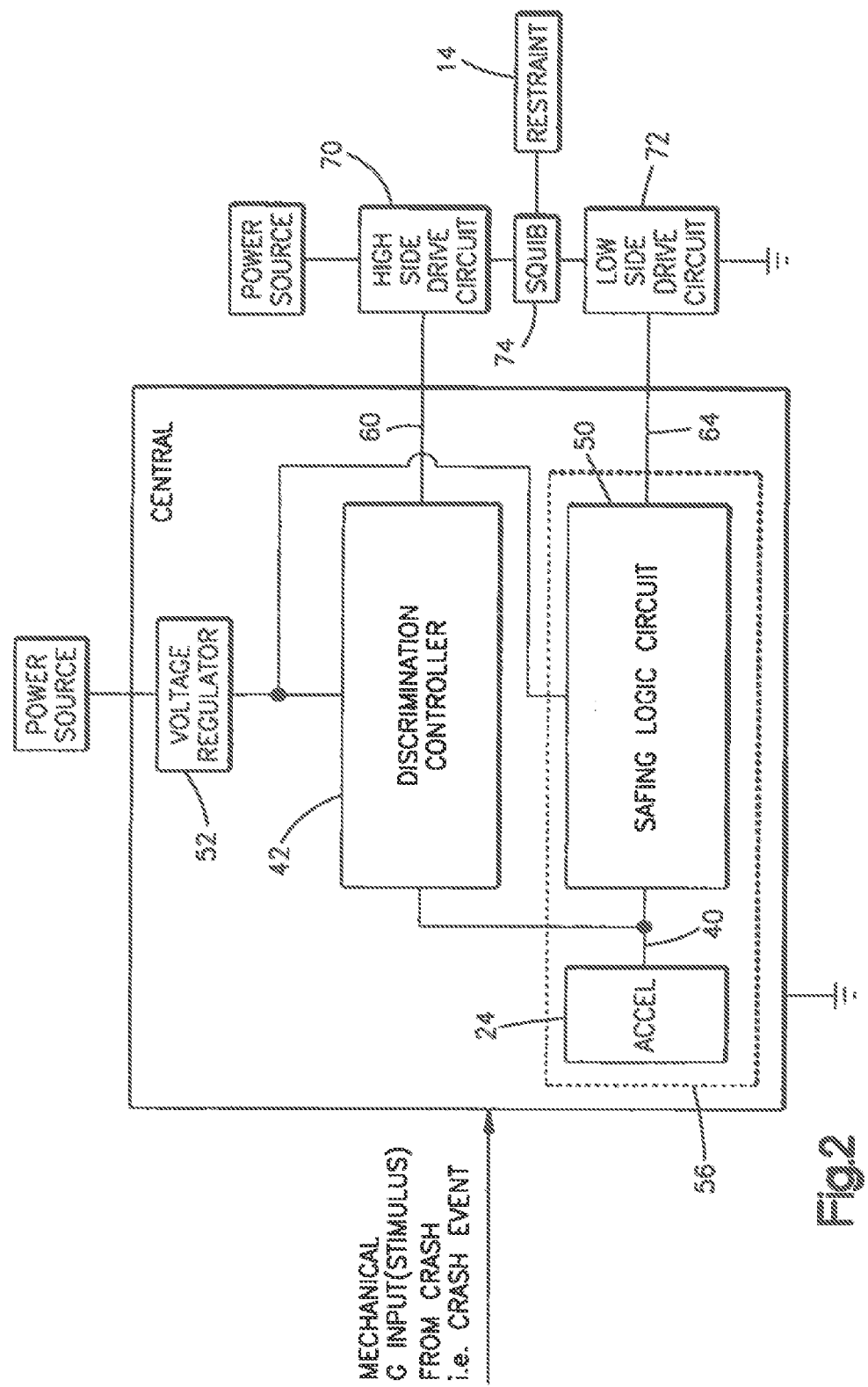
FIG. 2 is a schematic block diagram showing a control processing arrangement in accordance with one example embodiment of the present invention.

Referring to FIG. 2, the crash acceleration signal 40 from the crash accelerometer 24 (X-axis) is provided to a controller 42, such as, for example, a microcomputer. Although the one example embodiment of the invention uses a microcomputer, the invention is not limited to the use of a microcomputer. The present invention contemplates that the functions performed by the microcomputer could be carried out by discrete digital and/or analog circuitry and can be assembled on one or more circuit hoards or as an application specific integrated circuit ("ASIC"). The crash acceleration signal 40 preferably is filtered by filters to remove frequency components that are not useful in discriminating a vehicle crash event, e.g., frequency components resulting from road noise. Frequencies useful for crash discrimination are determined through empirical testing.

The controller 42 monitors the crash acceleration signal 40. The crash acceleration signal 40 is filtered within the controller 42 or is filtered external to the controller 42 or both to remove electrical components not indicative of a crash event. The controller 42 performs one or more preselected crash algorithms to discriminate whether a vehicle deployment or non-deployment crash event is occurring. Each discrimination crash algorithm measures and/or determines discrimination crash values of the crash event from the crash acceleration signal. These values are used for a discrimination deployment decision. Such measured and/or determined discrimination crash values are also referred to as "discrimination crash metrics" and include crash acceleration, crash energy, crash velocity, crash displacement, crash jerk, etc. These values may be compared against predetermined thresholds as part of the crash event determination.

The acceleration signal 40 from the accelerometer is also connected to a safing logic circuit 50 separate and effectively isolated from the discrimination controller 42 so as to sequester determinations made between the controller 42 and the safing logic circuit 50. The safing logic circuit 50 can take any of several forms including a separate microcontroller, a discrete logic circuit, a plurality of circuits arranged to perform a desired function on a single chip, etc. The safing logic circuit 50, independent of the discrimination controller 42, performs its own crash algorithms on the acceleration signal 40 and determines whether or not a deployment crash event is occurring by determining safing crash values and comparing those against thresholds. The controller 42 and the safing logic circuit 50 are electrically isolated so that an electrical problem in either device will not affect the other. Both the discrimination controller 42 and the safing logic circuit 50 receive electrical power via the vehicle battery through an appropriate voltage regulator 52.

In accordance with one example embodiment, the accelerometer 24 and the safing logic circuit 50 could be manufactured on a signal integrated chip 56.

The discrimination controller 42 outputs its determination result at output 60. The safing logic circuit outputs its determination result at output 64. To actuate an actuatable restraint such as the driver's side 14 and passenger's side front bag 16, both outputs from the discrimination controller 42 and the safing control logic 50 must agree that a deployment crash event is occurring, i.e., the outputs are effectively logically ANDed. In accordance with one example embodiment, the output 60 of the discrimination controller 42 is connected to a high side driver circuit 70. The output 64 of the safing logic circuit 50 is connected to a low side driver circuit 72. A squib 74 is operative connected between the high side drive circuit 70 that is, in turn, connected to a power source and the low side drive circuit 72 that is, in turn, connected to electrical ground. Activation of the squib activates the restraint, e.g., air bag 14. Those skilled in the art will appreciate that the connections between the safing logic circuit 50 and the discrimination controller 42 with the high side drive circuit 70 and the low side driver circuit 72 could be reversed.

Of course, those skilled in the art will appreciate that other inputs can be used in both the discrimination determination and the safing determination, i.e., inputs from the crush zone accelerometers 30, 32, lateral central accelerometer 26, other satellite accelerometers (not shown), acceleration rate accelerometers (not shown), roll-over sensors (not shown), etc. No matter which signals are used in the two determinations, the determinations are separate and sequestered or effectively electrically isolated from each other.

Figure 3:
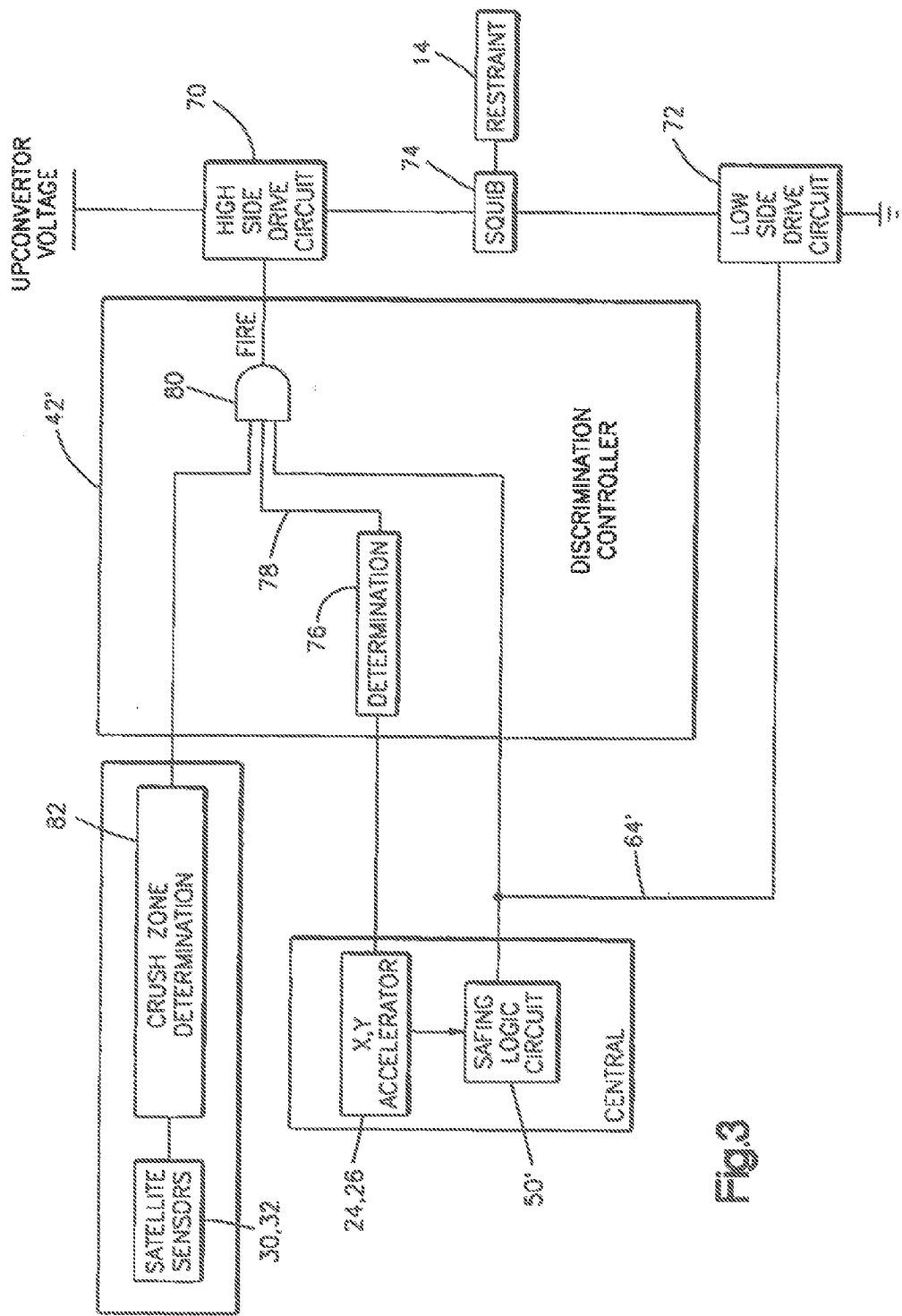
FIG. 3 is a schematic block diagram showing a control processing arrangement in accordance with another example embodiment of the present invention.

Referring to FIG. 3, another example embodiment of present invention is shown. In accordance with this example embodiment, the central sensors 24, 26 are connected to a determination function 76 within the discrimination controller 42'. The determination function 76 performs a discrimination algorithm using at least the X-axis accelerometer signal 24 to determine if a deployment crash event is occurring in the X direction of the vehicle. The Y-axis accelerometer 26 output may also be useful in the discrimination algorithm. The safing logic circuit 50' is independent of the discrimination controller 42', and monitors at least the X-axis accelerometer 24 output, and uses a safing algorithm to determine if a deployment crash event is occurring in the X direction of the vehicle. The Y-axis accelerometer 26 output may also be useful in the safing algorithm. The output 78 of determination function 76 is connected to one input of an AND function 80. The output 64' of the safing logic circuit 50' is connected to the low side drive circuit 72 as in arrangement of FIG. 2. Also, the output 64' of the safing logic circuit 50' is connected to a second input of the AND function 80 of the discrimination controller 42'.

The satellite sensors 30, 32 at the front of the vehicle 12 are connected to crush zone determination circuits that may take the form of discrete circuits or microcontrollers. The determination circuits monitor the outputs of the crush zone sensors and determine if a deployment crash event is occurring from the output of the crush zone sensor signals. The output of the determination circuit 82 is connected to another input of the AND function 80. Those skilled in the art will appreciate that the determination of the crush zone crash event could have occurred within the discrimination controller 42' rather that at the satellite location. The output of the AND function 80 is operatively coupled to the high side drive circuit 70. As was similar to the FIG. 2 arrangement, the squib 14 is connected between the high and low side drive circuits and is actuatable to inflate the air bag 14 when both the discrimination controller and the safing logic and the satellite sensors agree a deployment crash event is occurring.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for controlling an actuatable restraint system in a vehicle, comprising:
    a single integrated circuit having an event sensor mountable in the vehicle for outputting an electrical event signal having an identifiable characteristic upon the occurrence of a predetermined vehicle event and a safing circuit coupled to the event sensor for determining if a predetermined vehicle event occurred and for providing a safing signal in response thereto;
    a discrimination circuit coupled to the electrical event signal for determining if the predetermined vehicle event occurred and for providing an event discrimination signal indicative thereof; and
    an actuation device for actuating the restraint when both the event discrimination signal and the safing signal indicate that the predetermined vehicle event occurred.

2. The apparatus of claim 1 wherein the event sensor is an accelerometer and the predetermined vehicle event is a deployment crash event.

3. The apparatus of claim 1 wherein the event sensor is a roll-over sensor and the predetermined vehicle event is a vehicle roll-over.

4. The apparatus of claim 1 wherein said safing circuit is at least logically sequestered from said discrimination circuit.

5. The apparatus of claim 1 further including additional vehicle event sensors mountable to the vehicle for sensing the vehicle event, outputs from said additional vehicle event sensors being connected to both said discrimination circuit and said safing circuit, said determination by said discrimination circuit and said safing circuit being further responsive to signals provided by said additional vehicle event sensors.

6. A method for controlling an actuatable restraint system in a vehicle, comprising the steps of:
    mounting a vehicle event sensor in the vehicle, the vehicle event sensor sensing an occurrence of a predetermined vehicle event and having an electrical output signal having an identifiable characteristic upon the occurrence of the predetermined vehicle event;
    monitoring the sensor output;
    determining, using a discrimination algorithm, if the monitored sensor output indicates that the predetermined vehicle event occurred;
    determining, using a safing algorithm sequestered from the discrimination algorithm, if the monitored sensor output indicates that the predetermined vehicle event occurred; and
    actuating the restraint when both the determination using the discrimination algorithm and the determination using the safing algorithm agree that the predetermined vehicle event occurred.

7. The method of claim 6 wherein the predetermined vehicle event sensed by the sensor is a vehicle crash event.

8. The method of claim 6 wherein the predetermined vehicle event sensed by the sensor is a vehicle roll-over event.

9. The method of claim 6 further including the steps of assembling the sensor and the safing algorithm in a single integrated circuit package having a sensor output signal and a safing algorithm output signal.

\* \* \* \* \*